United States Patent
Jackson

(10) Patent No.: US 8,755,058 B1
(45) Date of Patent: Jun. 17, 2014

(54) SYSTEM AND METHOD FOR SELF-PUBLICATION

(75) Inventor: Steven Edward Jackson, Issaquah, WA (US)

(73) Assignee: Selfpublish Corporation, Issaquah, WA (US)

( * ) Notice: Subject to any disclaimer, the term of this patent is extended or adjusted under 35 U.S.C. 154(b) by 161 days.

(21) Appl. No.: 13/366,242

(22) Filed: Feb. 3, 2012

Related U.S. Application Data

(60) Provisional application No. 61/528,110, filed on Aug. 26, 2011.

(51) Int. Cl.
 - *G06F 3/12* (2006.01)
 - *G06F 15/00* (2006.01)
 - *G06K 1/00* (2006.01)
 - *G06F 3/14* (2006.01)
 - *G06K 15/00* (2006.01)

(52) U.S. Cl.
 CPC . *G06F 3/14* (2013.01); *G06K 15/00* (2013.01)
 USPC .......................................... 358/1.13; 358/1.1

(58) Field of Classification Search
 CPC ....... G06F 3/14; G06F 15/0291; G06F 17/00; G06F 17/211; G06K 15/00
 USPC ................ 358/1.1, 1.13, 1.14, 1.15
 See application file for complete search history.

(56) References Cited

U.S. PATENT DOCUMENTS

| | | |
|---|---|---|
| 5,392,387 A | 2/1995 | Fitzpatrick et al. |
| 6,065,026 A | 5/2000 | Cornelia et al. |
| 6,195,667 B1 | 2/2001 | Duga et al. |
| 6,314,409 B2 | 11/2001 | Schneck et al. |
| 6,597,314 B1 | 7/2003 | Beezer et al. |
| 6,714,214 B1 | 3/2004 | DeMello et al. |
| 6,725,203 B1 | 4/2004 | Seet et al. |
| 6,976,028 B2 | 12/2005 | Fenton et al. |
| 7,103,848 B2 | 9/2006 | Barsness et al. |
| 7,181,468 B2 | 2/2007 | Spring et al. |
| 7,246,118 B2 | 7/2007 | Chastain et al. |
| 7,260,781 B2 | 8/2007 | DeMello et al. |
| 7,290,285 B2 | 10/2007 | McCurdy et al. |
| 7,350,704 B2 | 4/2008 | Barsness et al. |
| 7,353,199 B2 | 4/2008 | DiStefano, III |
| 7,398,556 B2 | 7/2008 | Erickson |
| 7,401,286 B1 | 7/2008 | Hendricks et al. |
| 7,631,013 B2 | 12/2009 | Parsons et al. |

(Continued)

OTHER PUBLICATIONS

Website, "Book module: Creating structured documents", http://drupal.org/documentation/modules/book, last modified: May 12, 2011.

*Primary Examiner* — Douglas Tran

(57) ABSTRACT

A system and method for self-publishing includes components reflecting an author's intent with respect to other contributors and readers. Embodiments may include an object model which manages permissions to permit contributors to contribute content and services to the book to replace aspects of the traditional publishing process, and to offer new opportunities for republishing a book. A book may be an electronic book comprising context associated with a focus in the book which is reflected in schema underlying the book. Content may be added by contributors, and different versions of the book may be published with the new content. Ratings and other business intelligence may be provided to the original author to aid selection of contributors and content. A resulting book may be published electronically or as a hard copy.

23 Claims, 13 Drawing Sheets

(56) References Cited

U.S. PATENT DOCUMENTS

| | | |
|---|---|---|
| 7,783,986 B2 | 8/2010 | Barsness et al. |
| 7,818,261 B2 | 10/2010 | Weiskopf et al. |
| 7,849,393 B1 | 12/2010 | Hendricks et al. |
| 7,865,405 B2 | 1/2011 | Hendricks et al. |
| 7,912,752 B2 | 3/2011 | Subramanian et al. |
| 7,912,829 B1 | 3/2011 | Mathes et al. |
| 7,933,952 B2 | 4/2011 | Parker et al. |
| 7,945,476 B2 | 5/2011 | Subramanian et al. |
| 7,971,136 B2 | 6/2011 | Menachem et al. |
| 2001/0007980 A1 | 7/2001 | Ishibashi et al. |
| 2002/0002543 A1 | 1/2002 | Spooren et al. |
| 2002/0133464 A1 | 9/2002 | Ress et al. |
| 2002/0156702 A1 | 10/2002 | Kane |
| 2003/0018663 A1 | 1/2003 | Cornette et al. |
| 2005/0075943 A1 | 4/2005 | Potsch et al. |
| 2006/0026104 A1 | 2/2006 | Abe |
| 2006/0178997 A1 | 8/2006 | Schneck et al. |
| 2007/0038567 A1 | 2/2007 | Allaire et al. |
| 2008/0046829 A1* | 2/2008 | Leong .......................... 715/764 |
| 2008/0098294 A1 | 4/2008 | Le |
| 2008/0229182 A1 | 9/2008 | Hendricks et al. |
| 2009/0119173 A1 | 5/2009 | Parsons et al. |
| 2009/0298036 A1 | 12/2009 | Greenspan |
| 2010/0169460 A1 | 7/2010 | Angell et al. |
| 2010/0198693 A1 | 8/2010 | Lidwell et al. |
| 2010/0274622 A1 | 10/2010 | Kennedy et al. |
| 2010/0287464 A1 | 11/2010 | Grigoriadis et al. |
| 2011/0047498 A1 | 2/2011 | Hendricks |
| 2011/0113320 A1 | 5/2011 | Neff et al. |
| 2011/0131094 A1 | 6/2011 | Chuang et al. |
| 2011/0153464 A1 | 6/2011 | Hendricks et al. |
| 2011/0167350 A1 | 7/2011 | Hoellwarth |
| 2011/0184871 A1 | 7/2011 | Stahl |
| 2011/0191702 A1 | 8/2011 | Lunsford |
| 2011/0202424 A1 | 8/2011 | Chun et al. |

\* cited by examiner

SYSTEM AND METHOD FOR SELF-PUBLICATION

CROSS-REFERENCES TO RELATED APPLICATIONS

This application claims the benefit of U.S. Provisional Application Ser. No. 61/528,110 filed on Aug. 26, 2011, the benefit of the earlier filing date of which is hereby claimed under 35 U.S.C. 119(e) and further incorporated by reference.

BACKGROUND OF THE INVENTION

As electronic book readers become more sophisticated, and as the cost of technologies that are capable of producing rich media content decrease, providing rich media content to an audience is becoming more important. Traditional books are having a more difficult time competing with the content that is available through the Internet. And as electronic book readers become more commonplace, the demand for books printed on paper is going down, leaving authors with fewer opportunities to publish their works in a profitable fashion.

Much of the rich content that is available through modern technology is not accessible to an average author. Although modern electronic readers are being produced with increasingly sophisticated abilities, and markup languages such as HTML, HTML5, Javascript, and XML have been simplified through various applications, the level of technical sophistication required to incorporate rich content into a published work is beyond the abilities of most authors.

Another shortcoming of modern authorship is the lack of a format for collaborative efforts and continuing additions. The Internet facilitates websites where multiple authors can post their works, but a good system for controlling the contributions of multiple authors to a single work, especially with regards to rights and revenues, is lacking.

Formats accessible through the Internet are not well suited to reading on electronic book readers, and are often cluttered with unwanted advertisements and links that are present to provide revenue for the website.

BRIEF SUMMARY OF THE INVENTION

The present invention provides solutions to one or more of the above problems. In particular, the present invention includes a system and methods for providing readers and authors with content and opportunities based on intent, and more generally a wider notion of context that subsumes intent as a special case. A system according to the present invention may facilitate the re-authoring and re-publishing portions of an electronic book by one or more re-authors while preserving the wider contexts (including intent) if so desired by the original author at a location in the electronic book.

A computer implemented method for creating an electronic book may include providing a genre from a plurality of genres on a display device, each genre being associated with at least one template, providing a template for the genre, the template including an object policy configured to protect portions of the book that are selected by a first user, providing an intent element which reflects the first user's intent with respect to a first portion of the book, receiving a genre selection, and intent element selection, and the protected portions selection from the first user, applying a first permission associated with the intent element to a first portion of the book, binding a first content to the first portion of the book, causing the book including the genre and the template to be published, and providing a second content based on contextual data that is specific to a reader.

In an embodiment of the method, the first portion may be a set of objects sharing a common predicate from among a plurality of predicates selected based on the common predicate. The common predicate may be the intent element.

In an embodiment, the contextual data that is specific to a reader is reader location data.

The method may further include applying a second permission to a second portion of the book which is not included in the first portion of the book, providing business intelligence including a rating of a second user and sales information for other books in the genre, and sending book printing information to a printer to print at least one hard copy of the book.

The intent element may include a request for a bid to add content to the first portion of the book, and the first permission may be a permission for a second user to contribute content to a portion of the book.

The method may further include applying a second permission to a second portion of the book which is not included in the first portion, distributing a copy of the book to the second user, incorporating content created by the second user into the first portion of the book to create a second book, and publishing the second book.

The steps of publishing the book and publishing the second book may include applying a copyright to the book and the second book, the first permission may be a permission to add content to the first portion of the book, and the second permission may be a restriction that does not permit adding content to the second portion of the book.

Embodiment of the invention may include a computer readable medium including a computer executable program thereon, the computer readable medium comprising code for executing the above-described methods.

Further embodiments of the invention include an electronic book system including a processor, a display device, and a computer readable medium including a computer executable program thereon, the computer readable medium comprising code for executing the above-described methods.

DETAILED DESCRIPTION OF THE INVENTION

The present invention includes a system and method for creating and providing an electronic book. Although the following description uses specific examples of various embodiments, it should be appreciated that these are exemplary embodiments, and the invention is not limited thereto. Although embodiments of the invention are directed to electronic books which are authored and displayed by electronic systems, in the following contents, for the sake of simplicity, an electronic book may be referred to as simply a "book."

In an exemplary electronic book system (EBS), an author can create an electronic book providing rich content to readers, including intentions of a user that can be associated with certain actions or components of an electronic book and an electronic book reader. Examples of electronic book readers that are suitable for an electronic book system include a personal computer, a specifically purposed electronic book reader such as a KINDLE product by AMAZON.COM, a tablet computer, a handheld computing device such as a smartphone, a laptop computer, or any device which can establish a connection with an electronic data network, such as the Internet, and includes an electronic graphic interface screen. It is preferred that the electronic book reader is capable of communicating with the Internet either directly or indirectly, and has a screen capable of displaying text and images.

Figure 1:
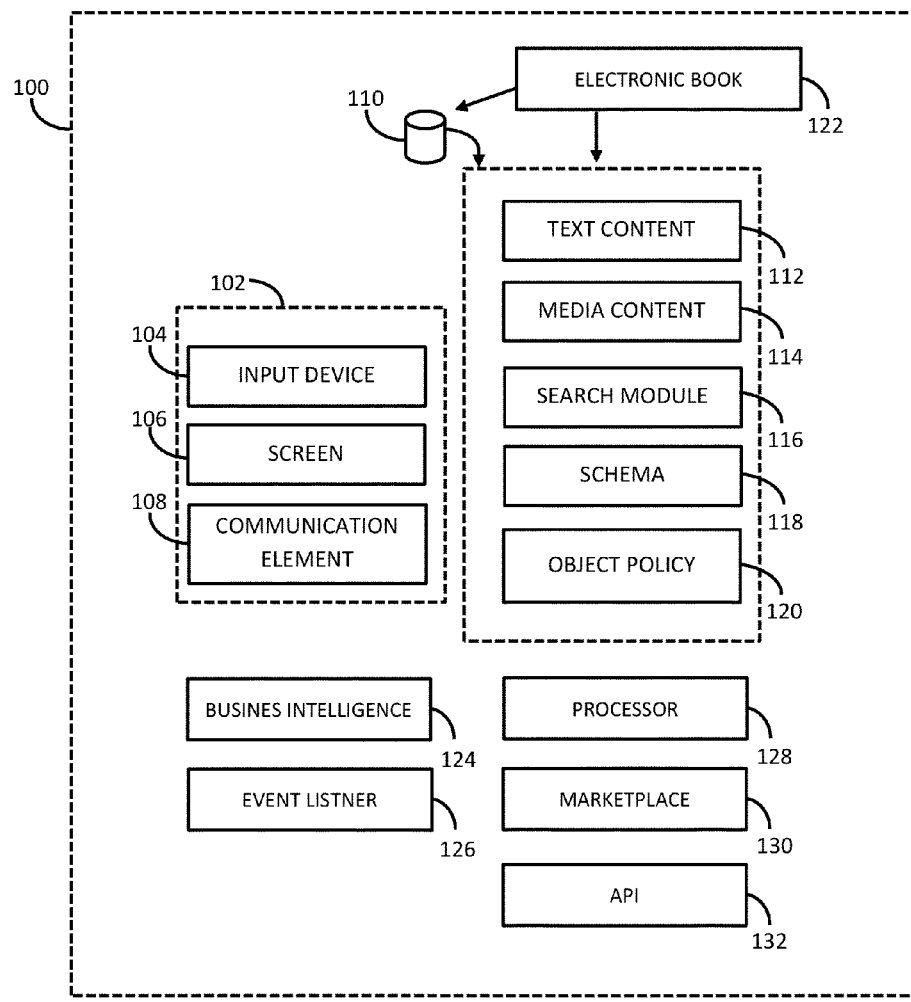
FIG. 1 is a block diagram of an embodiment of an electronic book reader system.

FIG. 1 illustrates an embodiment of an EBS 100. In the embodiment, an EBS 100 includes an electronic book reader 102. The electronic book reader 102 includes at least one input device 104. The input device 104 may be a keyboard, a mouse, a touch-screen, a microphone for converting vocal input into instructions, or a similar human interface device. The electronic book reader 102 further includes a display screen 106 for displaying book content, a communication element 108, and a computer readable medium 110. The computer readable medium 110 may have an operating system stored thereon.

Communication element 108 may be a wired or wireless device for communicating with an external apparatus for receiving, for example, information from the Internet or a remote database. Examples of communication elements include a Universal Serial Bus (USB) interface, a wired or wireless Ethernet device, a Bluetooth device, or the like.

Computer readable medium 110 may be any physical medium capable of storing data related to EBS 100. Examples of computer readable media include Random Access Memory (RAM), flash memory, Erasable Programmable Read Only Memory (EPROM), or other forms of semiconductor memory, a computer hard drive such as a magnetic or solid-state hard drive, optical media such as a Compact Disc Read-only Memory (CD-ROM), a magnetic storage device, etc. In an embodiment, a computer readable medium 110 communicates with electronic book reader 102 through communication element 108.

EBS 100 may include a component for allowing an author to author a book. Such a component may be an ordinary computer which may be a notebook, personal computer, tablet, or the like, or an electronic book reader 102. The component should include at least one input device 104 and a display screen. In certain embodiments, book reader 102 and the component are not part of EBS 100.

The EBS 100 may also include one or more electronic book 122. An electronic book 122 may comprise text content 112, media content 114, a search module 116, schema 118, and object policy 120. An electronic book 122 may be stored on a computer readable medium 110. In addition, EBS 100 may include business intelligence 124, an event listener 126, a processor 128, a marketplace 130, and an Application Programming Interface (API) 132. Processor 128 may be a computer processor that is configured to read and execute instructions that are stored on computer readable medium 110.

Figure 2:
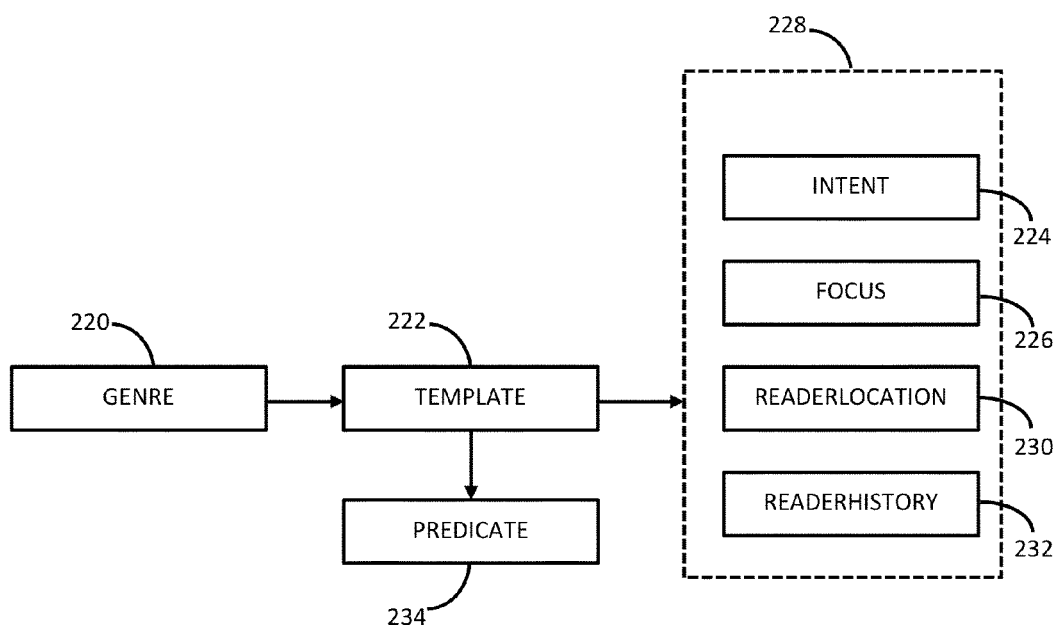
FIG. 2 is a block diagram of an embodiment an of electronic book reader system, including Schema relationships.

As shown in FIG. 2, EBS 100 may include a Genre 220, one or more Template 222, an Intent 224, a Focus 226, and Context 228. One or more Intent 224 may be included in a Context 228. These elements may be reflected in Schema 118.

A Genre 220 may be a general category of book, such as mystery, romance, science fiction, travel, and the like. The Genre 220 may be more specific than a conventional taxonomy of books. For example, in an embodiment, Genre 220 may include a general category such as travel, as well as a geographic location of travel, a budget for travel such as luxury or discount, a mode of travel such as boat, foot, or car, and trip duration such as weekend trips or month-long excursions. Genre 220 may be selected by an author during the process of authoring an electronic book 122. Genres are themselves schematized and one Genre may specialize another. For example, Children's Book: Baby or Children's Book: Young Adult are specializations of the Children's Book Genre. In an exemplary embodiment, a Genre may be an object defined by an object model in the EBS 100, satisfying the normal properties of object models, including class inheritance and the like.

A Genre 220 may be associated with one or more Template 222. Template 222 is a typed object that defines various aspects of the book 122. The Template 222 may define a format for a book, including predetermined fields for illustrations, text, and rich media content. In addition, the Template 222 may define the allowed Context 228 and subsequently Intents 224 that are part of the Template 222. In this manner, a Genre 220 is associated with an object model defined by the Template 222. In an embodiment, Template 222 may be configurable by an author, or completely determined by an author.

Furthermore, in specific embodiments, Templates 222 may contain computer executable code that is executed on the electronic book 122, or in the EBS 100, in response to a request made by a reader so as to provide rich content, search functionality, or other aspects for a reader, author or contributor to the book. The executable code may be in a plurality of forms, including Java, Javascript, HTML, or other accepted forms of portable executable code. For example, code in the Template 222 can execute an order to accept input from a reader. In another example, code in the Template 222 can execute on the EBS 100 in response to a search query from a user.

In an embodiment, an author may select a Template 222 from a plurality of predetermined Templates. The predetermined plurality of Templates 222 may be Templates that were generated by other authors for other books 122. In an embodiment, an author or reader may be able to provide a rating for a particular Template. In an embodiment, an author may be able to sort and select a Template based on ratings. However, in the case of re-authorings, the selection of Templates that are active for a book may be restricted by policy defined by the original author of the book.

When a Genre 220 is selected, one or more Intent 224 may also be selected by the author via Context 228 defined in the Template 222 selected by the author for the Genre. The author may be presented with a list of specific Intents 224, which can be selected to apply globally to the entire book 122, or to a specific portion of the book. The Intents presented to the author may be specific to the Genre 220.

In an embodiment, one or more Intent 224 is automatically determined by EBS 100. A particular Intent 224 can be automatically determined based on the Genre 220 of the book 122. In addition, a predetermined set of Intents 224 may be provided to an author, who can then select the Intent that the author wishes to associate with a book or a portion of a book, for example by selecting a box for each Intent to be applied, or by selecting a box for each Intent not to be applied.

The portion of the book 122 with which the Context 228, and hence Intent 224 is associated is a Focus 226. A Focus 226 may be the entire book, or a portion of the book such as a particular word, chapter, paragraph, passage, list, or illustration. In an embodiment, a Focus 226 is a physical location defined by a coordinate system 706 defined in a book 122 built by EBS 100. The coordinate system 706 can be visually conceptualized as a transparent overlay over the book that defines one or more physical location within the book, and is further discussed with respect to FIG. 7.

A Focus 226 may also correspond to a logical location within a book 122 based on predicates 234 written over Objects 702 that are defined in the book, such as Contexts 228, Intents 224 or any other Objects, including individual words defined as Objects in the book by the EBS 100. For example, the set of all Contexts in the book sharing a common Intent 224 may be a Focus, the set of all Contexts that share other elements of the Context such as physical location of the reader may be a Focus, or a set of words selected by an author in the book can also be defined as a Focus, and each of these sets may be associated with a predicate 234. In other words, a coordinate system 706 may span both the x/y coordinate and metadata layout regions of the book, and may also span a region of the underlying object model of the book satisfying a predicate defined over the model. Thus, a predicate 234 can be used to define a group of Objects within the Template 222.

The Template 222, Context 228 and Intents 224 associated with a particular Genre 220 may be stored in a database which is part of the electronic book system 100. The database may be stored locally on the device through which an author is authoring a book, or remotely on an external server on a computer readable medium 110.

The database of may be configured to evolve over time. For example, when authors select a Genre 220 and then select an Intent 224 via the Context 228 for the Template 222 in effect for the Genre 220, the electronic book system may record that information in a database. At periodic intervals, the system may review the Templates and associated Intents which authors have been selecting for a Genre, and select the Intents which a percentage of authors have selected for a particular Genre as Intents which are automatically provided when an author selects a Genre.

In an embodiment, Genre 220 may comprise a plurality of hierarchical categories. For example, a Genre may comprise a first category that is a general category such as "Children's Book." The Genre may further comprise additional sub-categories, such as "Fiction," "Ages 4-6," and "Girl." In this example, the final Genre would be Children's book/Fiction/Ages 4-6/Girl. Each of the Genre sub-categories may have different attributes and Schema 118, or they may inherit the attributes of one or more parent category. In an embodiment, the parent category defines default attributes for a Genre 220, and sub-categories are used to facilitate searching and sorting for the convenience of authors, readers, and other users.

An Intent 224 reflects an intent of an author or reader with respect to the book. An author may select content which is associated with a particular Intent 224 via a Focus 226 so that when a reader selects an Intent 224 or otherwise demonstrates intent near the Focus 226, that content is provided to the reader. The author may select the Intent from a menu or list by using an input device such as a keyboard, finger, or a mouse. In addition, in an embodiment, an author or reader may indicate an Intent through keywords, such as "@travel" for the intent of travelling, "@learnmore" for the intent of learning more about a subject, and "@meetup" for a notification to the book for a local group to meet.

In an embodiment, aspects of a Context 228 of a Book can be used to limit the scope of searches by the EBS100. The Context 228 can be different for a specific reader depending on time, location, or other aspects of the Context which may have both static and dynamic parts. Dynamic parts of the Context, such as ReaderLocation 230, may be computed by computer code contained in the Template 222 for the purpose of hydrating the Context.

Examples of Intents 224 which are reader intent include: Learn, where a reader wishes to learn more about some of the contents of a book; Acquire, where a reader wishes to acquire items referred to in the book or associated with a portion of the book; Author, where a reader wishes to author additional material that can be added to a book; Scribble, where a reader wishes to record his impressions of a book or portion of a book to share with others through the book or a publically accessible communication forum such as a social networking website, etc.

Examples of Intents 224 which are author intent include: Preview, where an author selects portions of the book that are available to prospective readers free of charge; Translate, where an author offers readers to contribute to a translation of the book into a different language; Sell, where the author wishes to sell items associated with the book, Accept Bid, where the author wishes to accept bids for other persons to contribute content to the book, etc. For example, an author who once selected an Update Intent 224 to have others contribute to the book may alter, replace, or delete the Intent from the Focus 226 to signal that the author is no longer accepting bids for content associated with the Focus. This action may be tracked by EBS 100, and the Intent associated with the Focus for that book may be automatically updated by the EBS when the reader next connects to the Internet.

By way of further example, in a cookbook, an author may associate an Intent 224 of Learn with a Focus 226 that selects a particular ingredient. The content that is associated with the Focus may be a video that explains facts about how the ingredient is used, where the ingredient comes from, or other information. The content may be created by the author, or it may be provided by an external source, such as a website. In some embodiments, the content may be provided by a contributor other than the original author. If a cookbook includes preparation instructions, the author may associate an Intent 224 of Learn with a Focus 226 of a particular preparation step, which the author can then associate with the content of a video or text explanation of how that preparation step is conducted.

In an embodiment, the association of content with an Intent 224 and Focus 226 can be performed automatically. In such an embodiment, the EBS 100 can analyze the text or graphic content of a Focus, and associate content provided by the system, re-authors, or the Internet. Content can include videos, online encyclopedia or dictionary entries, blogs, scholarly articles, websites where goods or services can be acquired, audio files, etc.

An author may be able to specify general categories of contents for a particular Intent 224 to assist with the automatic association of a Focus with content. For example, an author may specify that the EBS 100 will use contents from a particular website, online encyclopedia, or other source to automatically associate with one or more Focus 226. In an embodiment, content may be automatically selected by a smart selector, as shown in FIG. 6G.

In an embodiment, the EBS 100 may modify what contents are delivered and how they are delivered according to variables such as characteristics of a particular reader, the capabilities of the electronic reader 102 through which the book 122 is being accessed, the environment in which the electronic reader is located, or the like. If an electronic reader has a weak connection through a communication element 108, the EBS 100 may provide text-based information from an external source, but not associated video or audio content. For example, if an electronic reader does not have an audio output, content containing audio may not be provided. If a reader is in a particular geographic location, contents that are tailored to that location may be provided.

Similarly, in various embodiments, a reader may select which contents he would like to receive, and which contents he would not like to receive. This can be done manually by selection of the reader, or automatically based on reader behavior. For example, if a reader never selects scholarly article content associated with the Intent 224 of Learn, such content may be hidden from view, or may be displayed in a minimal format, during future reading for that particular reader. In an embodiment, a reader may be able to change settings associated with which content is displayed when the content selection has been determined automatically. In effect, the reader is performing an act similar to the author by binding a new Context 228 and hence Intent 224 to the Focus 226. The fact that Context 228 (which includes Intent 224) is a typed object makes this feasible by overriding author defined Intent with reader defined Intent. The settings may be recorded in Schema 118.

Other methods are available for a user to select how content is provided. For example, a user may select commands such as Play, which plays content, Edit, which allows the user to edit the content on a server if the user has been granted permission to do so, Search, which searches EBS 100 and possibly other sources for similar content, and Update, which updates the content. Such commands may be part of an object model included in the system, and consequently they may be restricted subject to object policy 120 as discussed below.

In an embodiment, event listener 126 is included in EBS 100. Event listener 126 may be configured to monitor content which is bound to a Focus 226. When the content bound to the Focus is stored in EBS 100, such as media content 114, the event listener may communicate with an external server to retrieve current information which is used to update the media content, and the updated content may be incorporated into a book 122 or the EBS 100.

In an embodiment, an Intent 224 can be specific to a particular demographic of reader, as selected by an author or automatically by EBS 100. That is, different readers may be presented with different content based on demographic information for the reader. For example, in a children's book, the content associated with a Focus 226 may be different for an adult reader than for a child reader. The child may be presented with age-appropriate content such as a sing-along video, while the adult may be presented with purchasing options for similar materials, or Scribbles created by other adults.

Context 228 may include one or more Intent 224, ReaderLocation 230, ReaderHistory 232, and other similar contents. In an embodiment, Context 228 drives the content provided to a reader for a particular Focus 226, in part because Context may include one or more Intent. A possible effect of this functionality is that for the same book, different Context 228, and hence content, can be created for different readers of the same book, or even the same reader satisfying a predicate test defined in the Template 222 such as test of a reader's location, capabilities of the reader, etc.

For example, a Context 228 for a particular Focus 226 that is a picture of a building may include an Intent 224 of Learn, a ReaderLocation 230 of Spain, and a ReaderHistory 232 that indicates the reader has not yet read past the page in the book where the picture is located. If the reader indicates intent to learn more about the picture, EBS 100 may display bibliographic information about the building, including that the name of the architect, the year it was built, where it is located, etc. Because the reader is located in Spain, EBS 100 may provide the contents to the reader in Spanish.

In another embodiment, an Intent 224 and the content that is associated with the Intent may be specific to other variables such as time and date. For example, in the case of a cookbook, different ingredients may be available in different seasons, so content related to those ingredients may change accordingly. In another example, an Intent may be associated with content for live interaction with others which may only be available, and thus only presented, at certain times of day. Time and date selectors may be included in Context 228 through the inclusion of active pieces of computer code such as JavaScript.

In an embodiment, an EBS 100 is configured to facilitate republishing of a book 122, where the republishing includes content that is generated by one or more persons other than the original author. In such a system, an original author may generate content to be displayed on an electronic book reader 102 including text, illustrations, audio, and video. The original author can then choose to copyright and publish the book as an original work, and/or configure the book to allow others (re-authors) to contribute contents. The original author may be more than one person that collaborated on the original work.

While authoring the original book 122 on EBS 100, the original author may select an Intent 224 which is configured to permit others to contribute content to the book, or to submit bids to contribute content to the book. The Intent 224 may be for general republishing, which can open all contents of the book to contributions to from all potential re-authors.

A republishing Intent 224 may be specific to a particular section, such as a Focus 226 in a book 122, and to a particular task to be completed. For example, an original author may wish to allow one or more re-author to contribute illustrations to a book. The original author could select one or more Focus 226 to be illustrated by a re-author, such as a cover page and one or more illustration. In another embodiment, an original author may be able to select the entire book to be illustrated by one or more re-author, such as in the case of a graphic novel.

Re-authoring opportunities are not limited to providing illustrations. Examples of other content that may be provided by re-authors include translation into one or more languages including braille, additional chapters or other text content such as annotations, rich media content such as audio or video files, and contributions to the Schema 118 including associating one or more Focus 226 with Intent 224 or content. Whether specific content can be contributed and the validation of such content is defined by permissions 708 in one or more Template 222 associated with the Genre 220 for the book 122.

In another embodiment, an original author may solicit bids for re-authoring various aspects of the book 122 including, but not limited, to the examples described above. In such an embodiment, the author can select a particular re-author based on various criteria including a rating of the re-author, a bid submitted by the re-author, or an exemplary submission.

The solicitation for bids may be included in the book 122 itself as an Intent 224, where a reader that is reading a book can express an intent to re-author selected contents. The Intent 224 of re-authoring or soliciting a bid to re-author a book may also be linked to a marketplace 130, which may be an online marketplace, where potential re-authors can search for various re-authoring opportunities. In an exemplary embodiment, such functionality can be provided by embedding executable computer code such as JavaScript in the Template 222 or the Intent 224.

The above concepts and embodiments will now be further explained with respect to methods for an EBS 100. Although the methods may be described with respect to a single embodiment, one of skill in the art will recognize that various steps or elements of a particular method may or may not be included in embodiments according to the present invention. An embodiment need not perform all of the steps in an exemplary method, and the steps are not restricted to the order in which they are presented.

Figure 3:
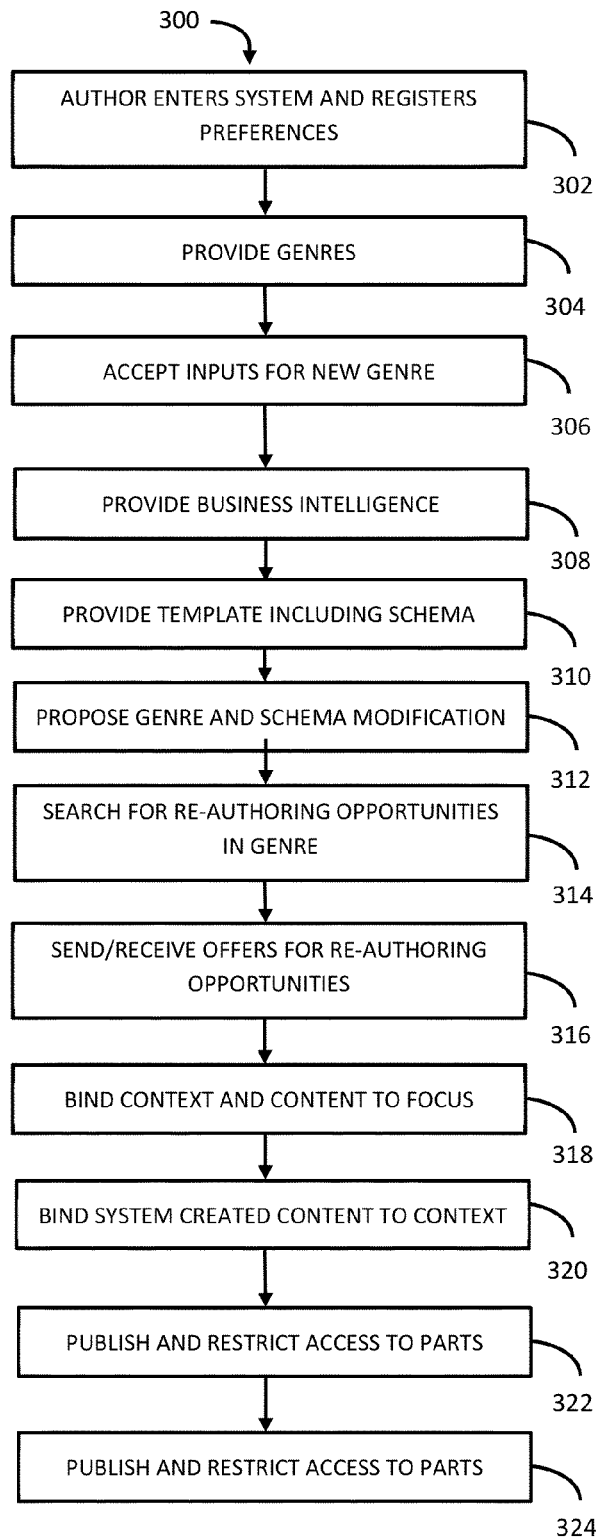
FIG. 3 illustrates a block diagram of an exemplary method for an electronic book reader system.

FIG. 3 illustrates an exemplary method 300 for creating a book 122 with an EBS 100. In step 302, an author enters the EBS and registers preferences. Preferences provided to the reader may include the native language of the system, preferences on how to view information, social networking groups to join or link to, etc. If an author has already developed a profile, the author can log into the system directly without repeating the registration process.

In step 304, the author can search Genres 220 within the system to select the appropriate Genre for a book 122. The list of Genres may be provided as tiles or as a list. The EBS 100 may provide additional information related to the Genre, such as what default attributes are included in a particular Genre, or information that is specific to a Template 222. In an embodiment, the author can select a Template separately from a Genre, and assign a particular Template and Genre to a book independently of one another.

In an embodiment, EBS 100 may present an author with Genre 220 attributes, which an author can select according to his preferences. The system may then present the author with the Genre that comprises the attributes selected by the author.

In an embodiment, EBS 100 may present Genre 220 attributes separately from the name of a Genre, and is configured to allow the name of a Genre to be changed after it is selected. That is, EBS 100 may permit an author to select the Genre attributes, including Schema 118, separately from the name of the Genre. The name of the Genre may be changeable after a Template 222 has been selected, after an initial Genre has been selected, or at any point in the process, including after a book has been published.

If an author wishes to categorize a book 122 in a Genre 220 that is not currently maintained by the system, in step 306, the system may accept an input for a new Genre. In such an embodiment, in step 312, the author can propose attributes of the Genre including a default Template 222 to be used or modified, or attributes of Schema 118. Whether the proposal is accepted by the EBS 100 may depend on Permissions 708 defined by the EBS.

The proposed attributes may become part of a Template 222 that is associated with a particular Genre. Associating a new Template with a Genre may occur automatically, or based on the input of an administrator or a plurality of users as defined by Permissions 708 defined for the Genre 220.

In step 308, EBS 100 provides business intelligence 124 on the Genre 220. The business intelligence 124 may be intelligence that is collected by or supplied to the system. An EBS 100 may provide or be associated with a marketplace 130 for selling electronic books and services associated with electronic books.

When an EBS 100 comprises such a marketplace 130, the system may collect information related to purchases, and the value of the services in terms of both monetary and perceived value, including ratings supplied by past purchasers and sellers. The EBS 100 may also collect information related to quantities and dates of transactions, and analyze the data in order to provide relevant information to an author or reader regarding re-authoring or purchasing opportunities. Business intelligence 124 comprises such information, and subsequent analysis of the information.

In various embodiments, business intelligence 124 may include the following information: 1) What steps in the process of authoring a book 122 authors have difficulty with, 2) Whether print or electronic book publication are a preferred form for a category such as a particular Genre 220 or authors with certain characteristics, 3) How long steps in the process of creating a book, including creating an entire book, take, 4) How many copies of books are sold in particular forums, 5) Whether integration with external entities such as social networking systems correlates with increased sales, 6) What are the most popular services within the system, 7) Summary reports across Genres and markets based on purchasing information of books for that market and Genre, 8) Summary reports of popular Intents 224 within a Genre, 9) Summary reports within a Genre of actions taken by users that show significant engagement, for example a buying action taken by a user base, a Scribble, etc.

In an embodiment, an EBS 100 may be able to assign a value, which may correspond to revenue, to an action, and then provide data sorted accordingly as business intelligence 124. For example, a user may be able to sort categories of Context 228, including Intents 224, to determine which Intents, or elements of Context, correlate to sales, how frequently certain Intents or elements of Context are used, etc. The examples of business intelligence 124 listed above are illustrative, and an embodiment may use one or more of the above examples, or other types of similar business intelligence.

Because EBS 100 is an integrated publishing system, it may keep track of all of this data, and feed it back to authors and the system in order to make improvements. For example, if authors in a particular Genre 220 show a preference for a particular book characteristic, that characteristic may become a default value for a Template 222 in the Genre. The system can correlate variables in a book 122 or authoring process with success in the marketplace, and provide an author with relevant data to improve the author's business position. EBS 100 may provide a marketplace 130, and may be highly integrated with one or more external marketplace, in order to collect and distribute the business intelligence 124. Furthermore, electronic books may include code and virtual memory configured to collect and store business intelligence 124 and send it back to the system over the Internet.

In step 310, EBS 100 may provide an author with a Template 222. The Template may be specific to the Genre 220, and may be subject to modification by the author according to the attributes that the author wishes to include. As stated above, in step 312, the author may propose modifications to the Genre and Schema 118.

In step 316, the EBS 100 may search and inform authors of re-authoring opportunities within a Genre 220, or other category. The re-authoring opportunities may be organized by a category such as Genre, or other categories such as a particular language for translation, a style or type of illustration, a field of expertise, a type of media, etc. In an exemplary implementation this may be done by the EBS 100 searching through the Intent 224 specified by an author by marking a specific Focus as available for re-authoring.

According to step 318, the EBS 100 may send or receive offers for re-authoring opportunities. Offers may be sent to external sources such as social networking systems or systems for facilitating work on a contract basis such as ELANCE, or received from such a source. In an embodiment, the offers can be accessed on a portable computing device such as a cellular telephone or tablet computer through wireless communication.

In an embodiment, an EBS 100 may include a marketplace 130 for re-authoring opportunities, so that sending and receiving offers may be conducted between a book 122 that is being created by an author and the system's marketplace, or between a potential re-author and the system's marketplace. The offers may include information related to attributes of the re-authoring opportunity such as price, ratings of the buyer or seller, time constraints, written descriptions of the need or service, samples, etc.

In step 320, the content is defined in the EBS 100. Content which may be defined in this step includes Schema 118, one or more Intent 224, one or more Focus 226, and media content 114. A system may provide an author with options to select portions of the book 122 to designate as a Focus 226, and further provide a set of options for selecting Intents 224 or media content 114 to be bound to the Focus.

When a user makes selections, the system can then bind the Intents 224, media content 114, or other content to the Focus 226. The resulting relationship is reflected in Schema 118. Because an Intent 224 is a component of Context 228, content may be bound to a Focus in the Schema through an associated Context.

As discussed above, defining the content of the EBS 100 may be conducted automatically by the system, or manually by an author or re-author. In step 322, the system binds content to Context 228 since the Context specifies aspects such as Intent 224, code that can execute against reader attributes such as ReaderLocation 230, etc. The content may be content automatically identified or generated by the system that the system deems to best match the Context active for the Focus 226 active at that time for a reader.

In step 324, the EBS 100 publishes and restricts access to portions of a book 122 subject to Permissions 708. The access restrictions may be applied based on default settings or as selected by an author to reflect intent to allow re-authors to submit content to a book. Subsequent to step 324, a book may be copyrighted and distributed.

Optional step 326 involves sending updates to external sources such as social networking systems. Embodiments of the present invention are configured to have a high level of compatibility with social networking or other similar websites for distributing and collecting information. Information sent in step 326 may include the fact that a book 122 has been completed, opportunities for re-authoring portions of a book, previews of a portion of the book, links to sources for purchasing a copy of a book, and other information that is relevant to the marketing and distribution of a book.

In an embodiment, a portion of a book 122 may be published to an external source such as a social networking system. The publication may include sending a portion of the book to the external source, or providing a link at the external location that links back to EBS 100. The portion of the book may be selected by an author, by the system, or by a reader. By handling the publication, the EBS can collect and provide additional business intelligence 124 associated with the publication.

For example, an author may select a passage in a book, which may be a Focus 226, and select an Intent 224 to share that portion with a social networking system. The EBS 100 then sends the selected portion of the book 122 to the social networking system in a form that can be displayed by the social networking system. The sent book portion may include computer code for tracking information such as the number of times the portion is viewed, which can be sent back to the system and provided to the author. Alternatively, the external source may provide a link back to an interface provided by the EBS which displays the book portion.

In another example, EBS 100 may provide an API 132 to allow external sources to interact with the system. Such an API may be configured to locate content within a book 122 that matches a query from the external source, and provide the content through an interface provided by either the EBS or the external source. The query may be generated based on a user input received by the external source, such as a search term. The API may be further configured to display the portion of the book, which may include rich media content, through an interface provided by the external source.

Figure 4:
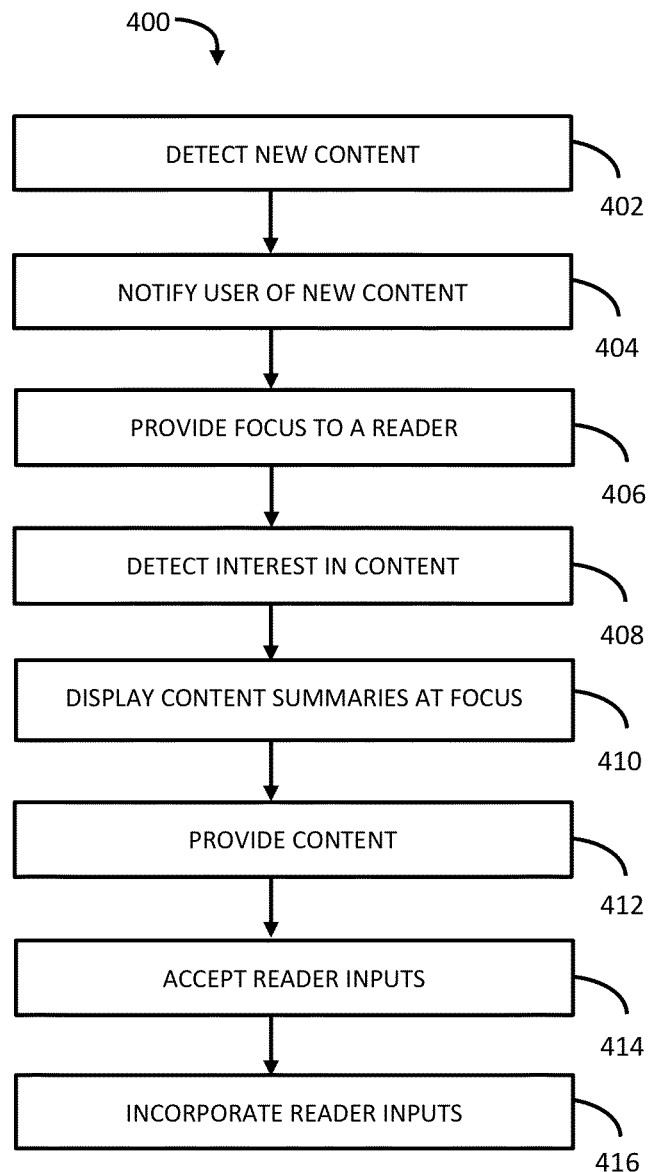
FIG. 4 illustrates an exemplary method performed by an electronic book reader system with respect to users including readers and re-authors.

FIG. 4 illustrates of a method 400 performed by an embodiment of an EBS 100 with respect to users including readers and re-authors. According to an exemplary embodiment, method 400 includes a step 402 of detecting new content in a book 122. The content detected in step 402 can be content created by an author, a re-author, or the EBS 100. The content may include a book, or a portion of a book. The portion of a book may include text content 112 or media content 114.

In step 404, the EBS 100 notifies a user of new content. When the subject of the notification is a reader, the information provided to the reader may be in a category specified by the reader. For example, if a reader has specified that he is interested in a particular Genre 220 or books by a particular author, only information related to that Genre or author is presented to the reader. In an embodiment, a user may specify one or more filter to apply to the new content, so that only new content that is of interest to that particular reader is displayed.

When the subject of the notification is a re-author, the information provided to the re-author may also be in a category specified by the re-author. For example, if a re-author has specified that he is interested in opportunities to submit illustrations for a particular Genre 220 of book, the EBS 100 may filter the new content so that only information related to such opportunities are provided to the re-author.

In step 406, the EBS 100 provides a Focus 226 to a reader. The Focus may be provided along with an indicator that there is Context 228 bound to the Focus. The indicator may be highlighting, different coloration, shadowing, or other similar visual effects, a window, a sound, or the like. In an embodiment, the visual or audio component that indicates that a Focus 226 is present may appear when the portion of the book 122 in which the Focus is located appears on the screen of an electronic book reader 102, or when a reader passes the target of a pointing device such as a mouse or a finger over the Focus.

The information provided to a user with respect to the Focus 226 may include the contents of the Focus, text summarizing the contents of the Focus, visual information such as an icon indicating a category of Focus such as video or audio clip, a sample of the Focus, or the like. In an embodiment, a user may select options on whether and how the EBS 100 indicates the presence of a Focus, and selections can be made based on the type of Context 228 or content that is bound to a Focus.

Default behavior for indicating the presence and content of a Focus 226 may vary based on the nature and size of a Focus and preferences of a reader. For example, a Focus that is a chapter of a book 122 is bound to an Intent 224 to solicit translations to another language may be indicated with a minimal visual effect, while a Focus that is a definition of a particular term may be presented in its entirety.

In step 408, the EBS 100 detects a user's interest in the content associated with the Focus 226. The system may detect an input from an input device 104 included in an electronic book reader 102 which is associated with a reader's desire to view the content. Examples include selecting a button associated with the content, selecting the Focus, and a particular keystroke or gesture that is associated with the action of viewing content.

In an embodiment, there may be a step 410 of viewing a portion or summary of the content before viewing all of the content associated with a Focus 226. For example, the EBS 100 may present a brief description of the content which a reader can view before choosing to view the full contents. This can be useful when the contents are large, such as a high resolution video, or involve actions such as accessing the Internet or launching a new application. This can also be useful when the content may be objectionable to certain viewers, such as a photograph of a battlefield depicting casualties.

In step 412, the content associated with a Focus 226 is provided by the EBS 100. The manner in which the content is provided may depend on the capabilities or circumstances of the electronic book reader 102 on which the book 122 is being viewed. When the book reader 102 is not capable of connecting to the Internet, through either the lack of capability or connection, content from the Internet may not be displayed or provided. In another example, if the content is highly dependent on color and the reader is not capable of displaying colors, the content may be provided as a text description or not provided at all.

The EBS 100 may provide content that is stored within the system itself, such as on a computer readable medium 110. The system may also provide content that is stored externally, such as on the Internet, an external media server, or a similar hardware device. In an embodiment, the content may be provided through a separate application, such as a video player, picture viewer, or Internet browser. The system may provide all of the necessary modules and components for providing the forms of rich media content provided through a Focus 226. In an embodiment, when content is provided from an external system, such content is stored temporarily on a computer readable medium such as a memory in the EBS.

In step 414, the EBS 100 may accept inputs from a reader. One type of input is text or media content related to a reader's impressions of a portion of a book 122, which can be referred to as a "Scribble." A Scribble may be a reader's written or recorded notes, which can be recorded as audio or video content. Thus, a Scribble may be a category of text content 112 or media content 114.

A Scribble may be private to a particular reader. In another embodiment, a Scribble can be shared with others, either by incorporating the Scribble into the book 122, or delivering the Scribble to an external location such as an author's website or social networking system.

In an embodiment, the Scribble can be provided to a portion of EBS 100 which is configured to display Scribbles. For instance, the system may include parts that are specific to a particular book 122, author, or other logical grouping, which may be configured to accept and display Scribbles from various readers. The system part that provides Scribbles may be selectable to display Scribbles from a reader or group of readers, or to display Scribbles associated with a particular Focus 226.

For example, a user of an EBS 100 according to such an embodiment can elect to view Scribbles that are provided by a particular reading club, social group, or individual. In addition, the user can elect to view all Scribbles for the user's favorite passage in a book to see other users' impressions of that particular passage.

In another embodiment, the Scribble may be an aspect of re-authoring. In this embodiment, an author may solicit for annotations to a book 122, such as through an Intent 224. The solicitation may be directed to a particular user or group of users, such as a professor or experts in a particular field. In an embodiment, a user may offer his Scribbles for sale in a marketplace.

Another reader input which can be accepted in step 414 may be a rating. The rating may be in the form of text, a value such as an integer value, or bivalent data such as like/dislike. A rating or feedback may be applied to an author, a book, a Focus 226, content associated with a Focus, services provided by a re-author, a Scribble, a search result, and the like.

In an embodiment, a rating can be a part of Context 228. In such a case, the rating may be used by the EBS 100 to select which content to display to a reader. In addition, the rating can be used by the system beyond the contents of a single book 122. For instance, ratings may be used to recommend or display books, authors, services, etc. to users of the system. Ratings may also be used to provide or deny opportunities to potential re-authors, to adjust the value of goods or services, to create business intelligence 124, to affect the results displayed by a search, and other reasons.

In an embodiment, a rating can be used to adjust schema for search module 116 that is tailored to a user. That is, the schema for a search module may be adjusted based on a plurality of ratings received from a reader. For example, when a user indicates a preference for a particular item such as a content, book, or author, the search module may adjust its schema for that particular user to include results that are adjusted according to the preference. In an embodiment, an EBS 100 may provide a user with the ability to view and directly adjust schema in the search module 116.

In step 416, the EBS 100 incorporates the inputs that were input in step 414. The inputs may be incorporated by being written to a computer readable medium 110, or by adjusting a value stored in a computer readable medium. Depending on the nature of the input, the input may be included in a book's contents, a user's profile, a remote server, an external source such as a social networking system, an electronic book reader 102, etc. In an embodiment, when reader contents are included, the system may perform the steps 402 of detecting new content and 404 of notifying users of new content.

Figure 5:
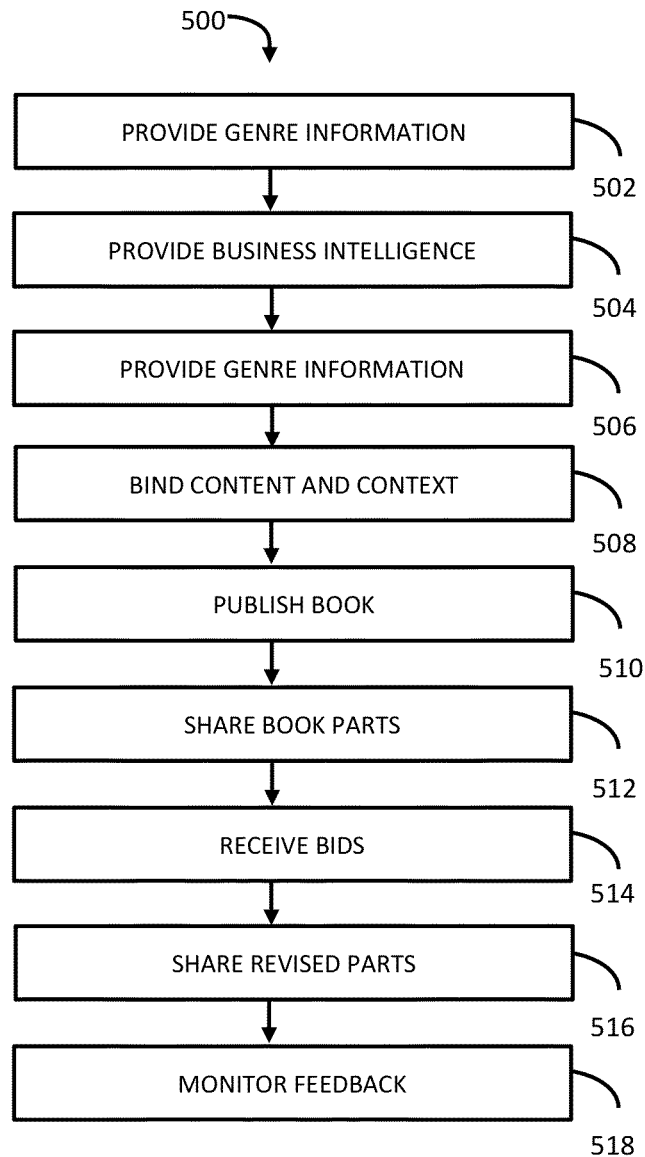
FIG. 5 illustrates an exemplary method performed by an electronic book reader system with respect to users including authors and re-authors.

FIG. 5 illustrates of a method 500 performed by an embodiment of an EBS 100 with respect to users including authors and re-authors. In method 500, a user is provided with information displayed on a display screen. The initial information provided to a user may be login information in the form of a graphical user interface such as the embodiment shown in FIG. 6A. In an embodiment, the login process is completed automatically.

In step 502, a user is provided with information related to a Genre 220. The information may be provided based on a user's selection of a particular Genre from a set of Genres. For example, the user interface shown in FIG. 6B includes a list of Genres on the left side of the interface, where the Genres are sorted by the category of "most popular." Additional methods of sorting include alphabetical, favorites, and keyword.

In step 504, a user is provided with business intelligence 124 related to a selected Genre 220. The business intelligence 124 may include information on the market for the Genre such as average sale quantity and price for books in the Genre, the availability of re-authors to the Genre, readership, activity in a social networking system, etc. In an embodiment, a user may view Genres sorted by various aspects of business intelligence. An example of business intelligence 124 which is displayed to a user can be seen in the graphs and charts shown in FIG. 6C.

If the user is a re-author, step 504 may provide the re-author with business intelligence 124 on what opportunities are currently available for re-authoring tasks such as illustrations, translation, providing media content, and the like.

In step 506, the EBS 100 provides a user with information related to a Genre 220. The information may include various aspects of one or more Template 222 associated with a Genre, such as the size of a screen, contents and Intents 224 that are available, whether or not illustrations are to be included, etc. The information may be selected to help a user choose the format or Template that is most suitable to the user's intent. In addition, the user may be provided with a tutorial, which may be a book 122 on how to author or re-author within a Genre or Template, which can include all of the attributes of a book according to the present invention.

In step 508, the EBS 100 may bind Context 228 including one or more Intent 224 and various content to a Focus 226 in a book 122. As discussed above, the Context including Intent and one or more Focus may be selected by an author or re-author, as well as conducted automatically. In an embodiment, an Intent 224 may reflect intent to submit a portion of a book for re-authoring.

In step 510, the book 122 may be published. The step of publishing a book may include recording a copyright for the book, where the copyright is selected from a set of copyrights which reflect different republishing, re-authoring, and revenue sharing models. Publishing may also include submitting a version of a book for sale in various marketplaces including a marketplace 130 within EBS 100 and to the Library of Congress. In an embodiment, a book may be published and republished a plurality of times when content is added or revised by re-authors or the original author.

Additional components of step 510 may include actions with regard to publishing a hard copy of a book 122. For example, EBS 100 may provide a user with options for printing and distributing hard copies of a book that was created in the system. Options may include a list of potential printing and distributing resources, which may be sorted by rating.

In an embodiment, an electronic book 122 comprises sufficient data, including objects and relationships, to create a printed hard copy of the book directly from the electronic copy. Information included in Schema 118 may include formatting information such as font, color, margins, and other information beyond the minimum information necessary to display the electronic book on a display screen. In an embodiment, such formatting information may not be included in some copies of the book such as copies distributed to social networking websites. Whether or not to include the formatting information may be based on an Intent 224 specified by an author.

A hard copy of a book 122 published through EBS 100 may comprise elements which reflect rich media content and author Intents 224 which are present in an electronic copy of the book. For example, a hard copy may include one or more Uniform Resource Locator (URL) for a website that includes the rich content. In an embodiment, access to the content may require registration or forms of authentication establishing that a user owns a hard copy of the book. For example, hard copies of books may include unique identifiers as proof-of-purchase which permit a reader to access the rich content. In another example, a reader can receive an electronic file through email or other means that includes the content, or a link to a resource providing the content. Through these methods, a reader of a hard copy of a book may experience the same content as the reader of an electronic copy.

In step 512, the EBS 100 may submit a book 122 or portions of a book to reviewers, book clubs, various websites, and social networking systems. Information submitted in step 512 may include re-authoring opportunities, and a source to receive a submission may be selected on the basis of facilitating re-authoring.

In step 514, the EBS 100 may receive bids for re-authoring portions of a book. The bids may be submitted to the author or book owner along with information related to the bid and the bidder, including one or more rating, sample, value information, etc. The author or owner may then choose whether to accept or deny a bid. If a bid is not accepted, the system may transmit the bid denial to the bidder, who may then submit a revised bid, and so forth. In an embodiment, the system is configured to facilitate communication between an author and a re-author during the bid process, for example by providing details within the system and a forum for direct communication.

In step 516, a republished book 122 or portions of a republished book which include portions not found in the original book may be submitted to external sources in a manner similar to step 510.

In step 518, the EBS 100 may monitor feedback and ratings associated with a published book 122, and relay that information back to an owner, author, or re-author. Feedback and ratings may be included in business intelligence 124.

FIG. 6A to FIG. 6G illustrate various embodiments of information that may be presented to a user through a user interface on a display screen.

Figure 6A:
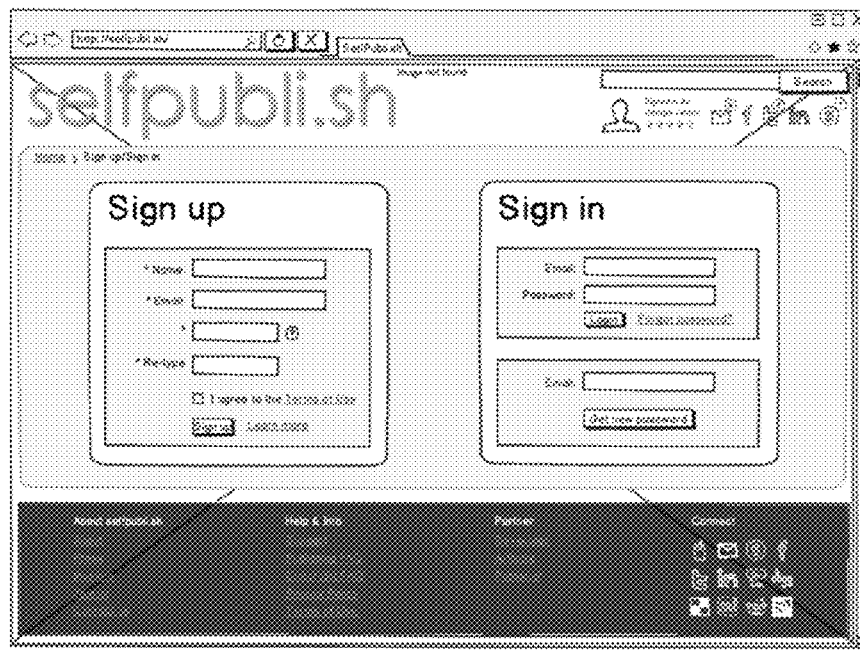
FIG. 6A-6G are embodiments of information presented to a user of an electronic book reader system.

FIG. 6A shows information that may be presented to a user upon entering an EBS 100. The information includes login information for a user that is already registered, and registration information for a new unregistered user. In an embodiment, a user is automatically logged into the system.

Figure 6B:
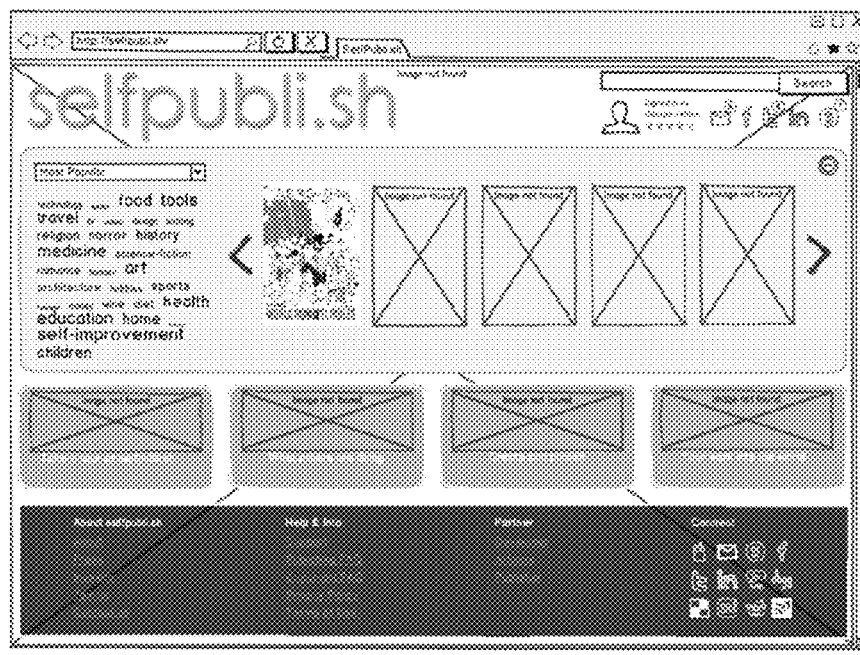

FIG. 6B shows information that may be presented to a user including Genre 220 information and a set of tasks available to the user. Tasks include learning more about the EBS 100, viewing popular activities within the system, authoring a book, and viewing data collected by the system related to one or more books or re-authored portions of books.

Figure 6C:
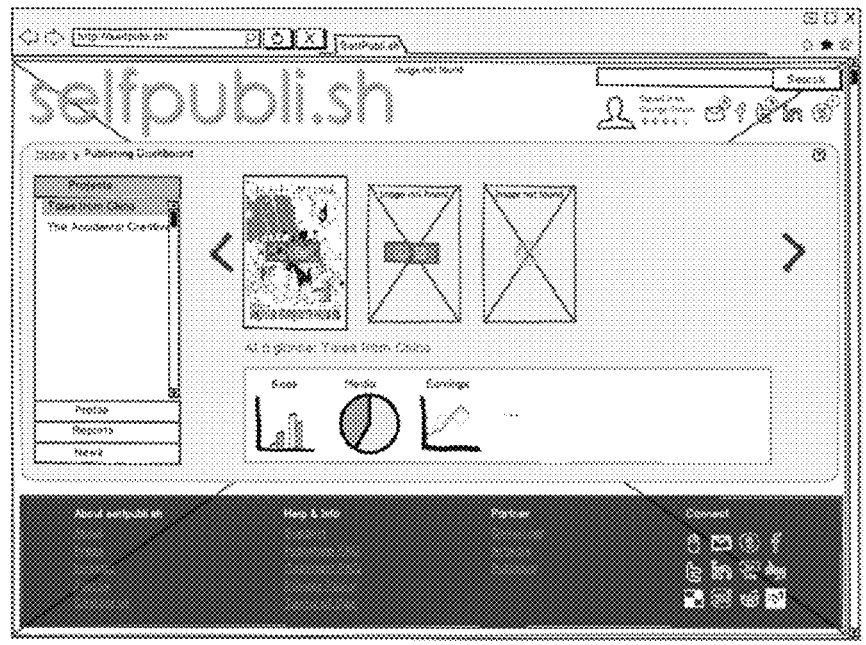

FIG. 6C shows information that may be presented to a user with respect to a published book. The information includes business intelligence 124 such as how many copies have been sold, revenue generated by sales, rankings according to other authors or a Genre 220, etc. Similar information may be presented with respect to re-authored portions of a book, various republished versions of a book, etc.

Figure 6D:
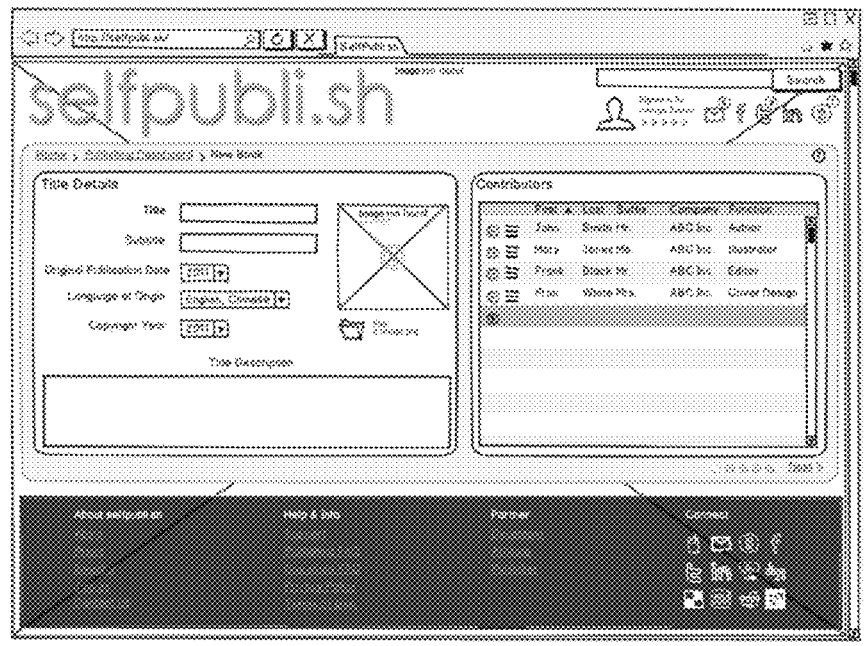

FIG. 6D shows information that may be presented to a user with respect to authoring a book 122. The information includes various components of the book such as title, language, and publication date. In addition, a list of potential re-authors, or contributors, is presented, which are available to perform particular functions in the publishing process.

Figure 6E:
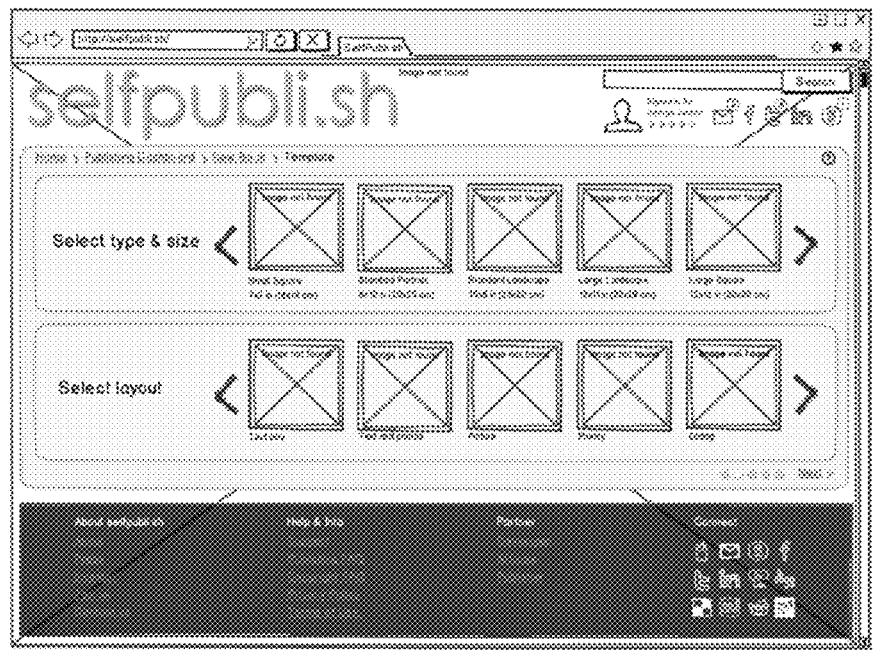

FIG. 6E shows information that may be presented to a user with respect to a Template 222. The information includes the type and size of the overall layout, and various contents that may be included in the layout. In an embodiment, Templates are presented that are specific to a Genre 220, or are based on a Template that has been used in a prior book. In an embodiment, the current author can select a particular book to use the same Template that was provided to that book.

Figure 6F:
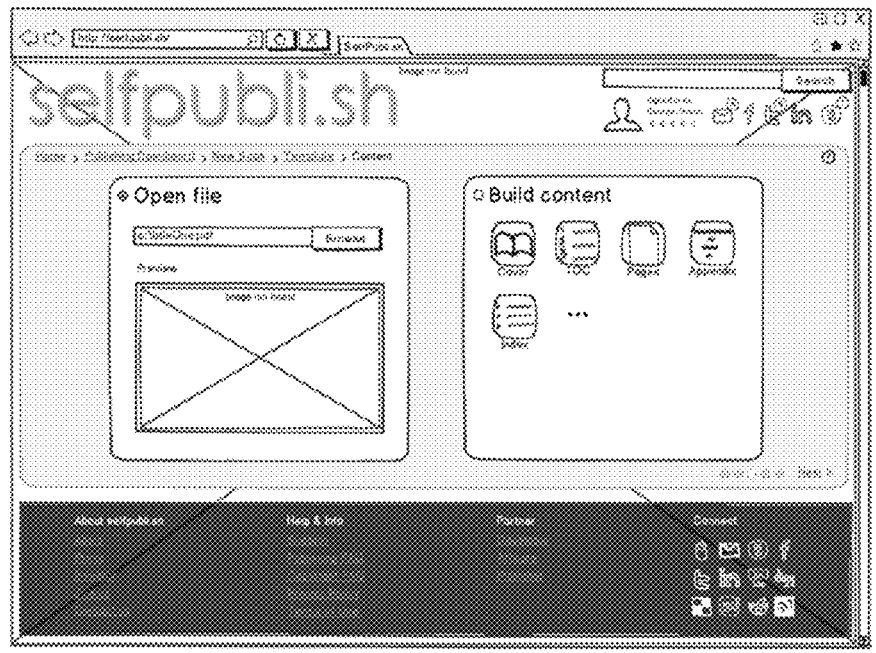
Figure 6G:
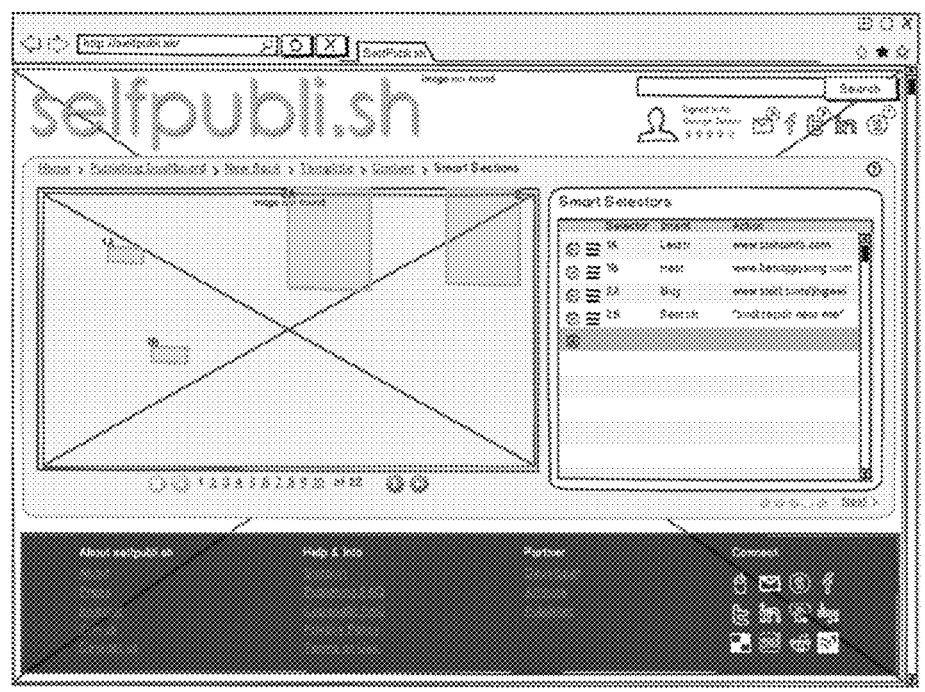

FIG. 6F shows information that may be presented to a user with respect to adding content to a book 122. The information includes a source of the content which may be a file that is internal or external to the EBS 100, an area where a URL can be indicated, and where the Focus 226 with which the content is associated is located.

FIG. 6G shows information that may be presented to a user with respect to adding content to a book 122. EBS 100 may assist with providing content through one or more smart selector. A smart selector may be selected based on an Intent 224, and provide content related to that Intent to a Focus 226.

The smart selector can automate various aspects of the content selection process as explained above, for example by acquiring content from the Internet based on parameters selected by an author. Default parameters for smart selectors may be set for a particular Genre 220 or Template 222.

Re-publishing is facilitated by EBS 100. However, because a user may use the system to create and publish a book 122 which may be commercially distributed, a copyright scheme to accommodate elements of re-authoring and republishing is desirable. Although conventional copyright systems such as a Creative Commons License include elements to accommodate republishing, EBS 100 may include the following elements, which are not present in conventional systems: 1) a revenue return model for the licensor and licensees who produce derivative works may be explicitly specified and part of the terms of the license, and 2) a mechanism by which an author can designate portions of the book to have more restrictive licensing. Such elements allow an author, especially an original author, to preserve intent, including an Intent 224.

In an exemplary system, the Intents 224 are part of an author's copyright claim, while the underlying schema for the book 122 is the property of EBS 100 and is licensed to the author under, for example, a CC-BY-ND license as specified in the Creative Commons License. Elements of a copyright system and permissions model as described herein may be provided to users by EBS 100.

Figure 7:
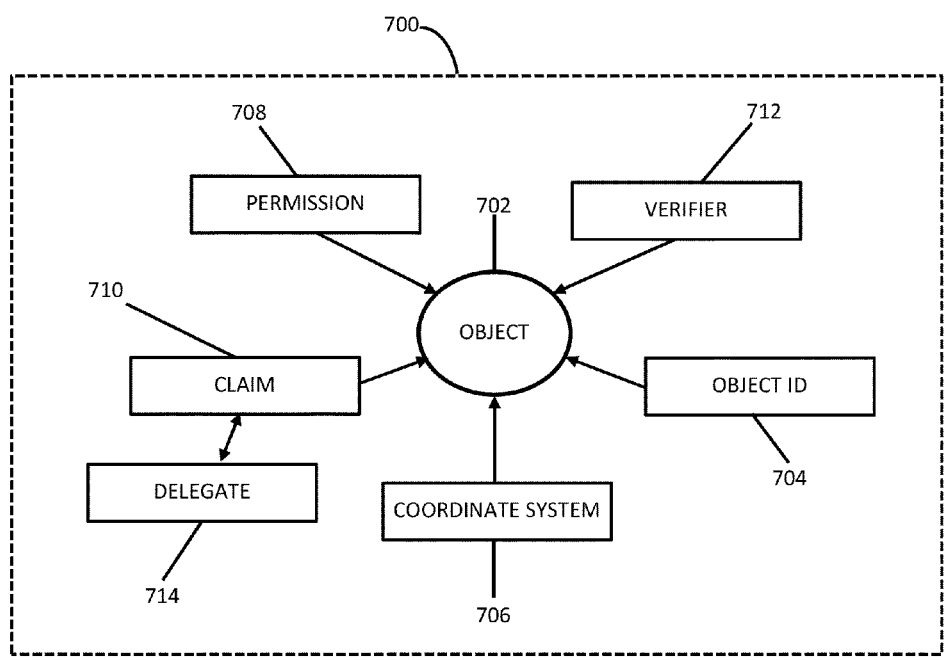
FIG. 7 is a block diagram of an embodiment of an object policy.

One challenge in a republishing model is how to preserve the intent of an author, which may be the original author. To aid this, as illustrated by FIG. 7, an embodiment of EBS 100 defines and enforces an object policy 700 that may be defined by the author on the object model defined by the Template 222.

An object policy 700 interacts with the object model that ensures that the intent of the author is not being violated. In such a system, all principals, including an original author, a re-author, a reader, and other users, are security principals. In an embodiment, EBS 100 is a security principal. Concepts in computer security such as groups or claims 710 can be used to define security principals and their permissions.

An object policy 700 may include at least one Object 702, which is identified by an Object ID 704. An Object 702 may be a word, sentence, paragraph, chapter, illustration, or any other portion of a book 122, including an entire book or Focus 226. Furthermore, a third party application or code, which may represent a person such as an editor, may be an Object in the system.

Attributes of an Object 702, such as the ranking of a person or code, can be used as claims 710 by the EBS 100 in deciding whether the security principal authenticated as that person or code can gain a specific Permission 708, including the right to re-author some or parts of a book. For example, an ELANCE ID along with a Claim from ELANCE that the person has high ranking may be used to filter or reject re-authoring requests from a re-author. In another example, digital code signing can be used to provide identity for a piece of computer code for the purpose of associating rights for the said piece of code to execute as part of a book—e.g. a multimedia player.

Each Object 702 is identified with an Object ID 704, which is unique to every Object 702 within a book. The relationships of the Objects are designated in a coordinate system 706, which effectively maps out the contents of a book 122 as described above with respect to FIG. 2. By defining Objects 702 in this way, EBS 100 provides sufficient information to format a book according to a plurality of electronic and hard copy formats, and to allow an author a high level of flexibility in implementing various features of EBS 100. One of skill in the art will recognize that the elements of object policy 700 are also elements of EBS 100, and may be included in or interact with other parts of the system.

Each Object 702 is associated with one or more Permission 708. A Permission 708 may be a permission to edit, author, re-author, share, publish, accept bids for, or distribute an Object 702, though the EBS 100 may be allowed to extend the set of permissions as appropriate over time. EBS 100 may integrate with third party platforms such as social networking systems. As such, an object policy 700 may be designed to allow easy integration with social groups to restrict, in some embodiments, data sharing and group membership with the group by specifying a Permission 708 within the infrastructure which then integrates with the third party platform. This may be performed by specifying an action and a Permission 708 for Objects 702 created by the action.

A Permission 708 may be subject to a claim 710. In an embodiment, the authorization required to access an Object 702 can be defined by claim 710. In an embodiment, a claim 710 is an authenticated attribute of a requester as stated by an authority (such as FACEBOOK, GOOGLE, ELANCE, etc.) that EBS 100 communicates with. For example, in the case of FACEBOOK, a claim 710 might be that a person with FACEBOOK ID X is a member of a specified FACEBOOK group. In this example, in order to access an Object 702 in EBS 100, the person has to be a member of the above FACEBOOK group.

Accordingly, a claim 710 may be issued by an authority, and may be specific to certain subjects. For example, a subject of a claim may be an antivirus program which is established by a third party system. In another example, the subject may be an editor as established by EBS 100 through attributes such as one or more rating, or other aspects of a profile of a particular editor as maintained by EBS 100.

EBS 100 may check to see on access if a person is a member of a particular group before granting a Permission 708 to the Object 702 in the EBS 100. Multiple Permissions 708 are possible. For example, write permissions for portions of a book may only be granted to subjects who an external source identifies as illustrators and have rating greater than a specified value. Such information can be used as a filter by an author.

Object policy 700 may also include one or more Verifier 712. Even though access to an Object 702 has been successfully granted through a claim 710, the Object passes through a Verifier 712 to ensure that it meets a set of criteria before being finally included in the book 122. The criteria can be quality as defined by the author, who may be the Verifier 712. In an embodiment, EBS 100 will not finalize a re-authoring transaction, including payment, until the new contents have been verified by one or more Verifier 712. The EBS 100 can also act as a Verifier 712.

In an embodiment, the verification may be performed by a Delegate 714, which can be specified by EBS 100 or an author. In such an embodiment, a Delegate 714 is a Verifier 712. A Delegate 714 may be EBS 100, a third-party application such as antivirus software, or a person such as an editor that is designated by the author.

For example, consider a policy where a person is allowed access to a part of a book 122 only if an authorizer grants access. In this example, the authorizer issues a claim 710 to the requester. Next, an access control on the Object 702 checks to determine whether the authorizer was allowed to authorize access and then to see if the requester has the specified claim 710. In EBS 100, such a method can be used to implement delegation by the author to Delegates 714, such as editors or other trusted subordinates, for the ability to selectively use external services to edit or add to a book 122.

Figure 8:
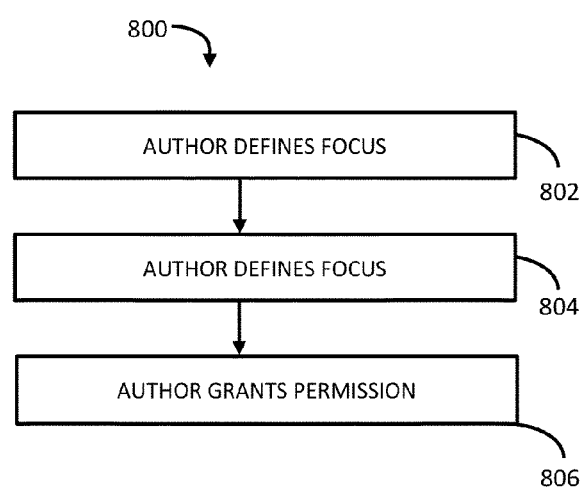
FIG. 8 is a block diagram of an embodiment of a permissions method.

In an exemplary embodiment, if an author wants to ensure that his original illustrations are not changed, the following permissions method 800 may be implemented, as illustrated by FIG. 8. In step 802, an author defines a Focus 226, which may, for example, span an illustration. In this case, the illustration is an Object 702. The illustration Object may not have image content; it may be merely a placeholder. In step 804, the author grants a Permission 708 to the Object, which may be, for example, to call an Update method on the illustration Object only to the author.

Figure 9:
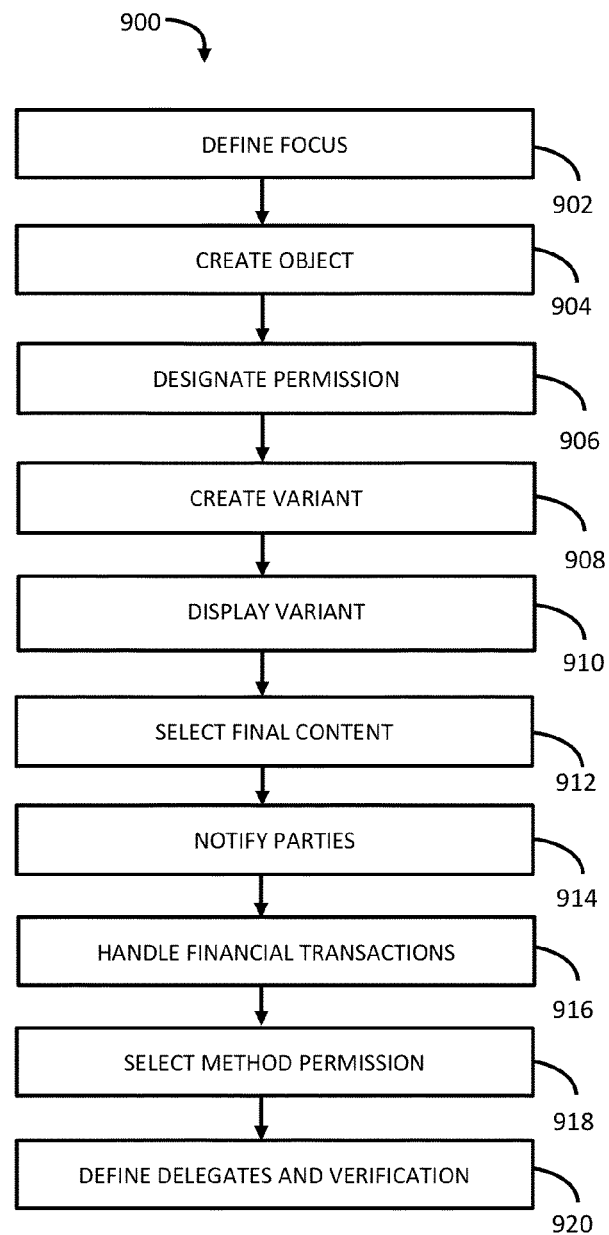
FIG. 9 is a block diagram of an embodiment an of a permissions method.

If on the other hand, if the author wants to have an illustrator fill in an illustration for him, then a different permission granting method 900 may be implemented. An exemplary method 900 may include the following steps, as illustrated in FIG. 9. The steps are explained with respect to an example of updating an illustration.

In step 902, the author defines a Focus 226. In step 904, an Object 702 is created. In this example, the Object is an illustration which does not include image data.

In step 906, the author may designate a Permission 708 to grant permissions to call Update (whether to permit the Object 702 to be updated) to a selected set of security principals in the system.

In step 908, the principals create independent variants of content for the illustration. In an embodiment, the content created by one illustrator is not changeable by another since the separate illustrations are separate Objects 702 in the system, and by default are changeable only by the creator.

In step 910, EBS 100 shows the author all the variants by displaying a selectable list of contents at a particular Focus 226 and information about the creator, which may include a rating or ranking of the creator.

In step 912, the author as Verifier 712 selects the final illustration. In step 914, EBS 100 notifies the author and the illustrator of the choice. In step 916, EBS 100 handles financial transactions associated with the illustration.

In step 918, the author decides if he wants methods such as Update, which may be an Intent 224, on the illustration Object 702 locked down by a Permission 708 or not. In an embodiment, default values for Permissions are specified in the Template 222. When the Update method is not locked down, the book 122 can get newer and newer illustrations over its lifetime subject to an Intent.

If the Author wishes to keep control of the illustration pipeline, then in step 920 EBS 100 allows the author to define a verification step before new Intent 224 is surfaced. Examples of verification steps are where the author as Verifier 712, or a Delegate 714 where the Delegate may be EBS 100, a piece of code, or a third party program or person selected by the EBS, previews the Object 702 before approving the update.

In an embodiment, more than one Delegate 714 may be linked. For example, a virus checker may be a Delegate for all pipelines. Delegates can also be linked to form a trusted pipeline in the sense of Boebert and Kain in order to ensure a one-way flow through a set of Verifiers 712.

An object of these aspects of the invention is that of the author granting permission to update an Object 702 subject to verification. Multiple verifications are possible for a single Object, such as virus scanning and reviewing for content appropriateness.

Every Object 702 may have a Verifier 712 bound to it that can be invoked to verify proposed changes to the Object even if the access to the Object is granted. As a result, EBS 100 can ensure that even if the author contracts with an illustrator to provide new illustrations, the illustrations are reviewed before being published into the book.

The following is a simplified example of how the policy system defined in EBS 100 allows author intents to be respected and for a viable republishing industry to develop. Every Object 702 defined in EBS 100, including Template 222, can be locked down or opened by the object policy 120 using access control on the event listener 126, method calls, and other properties of the underlying Objects. If the author does not wish to permit republishing for the entire book 122, then he can lock down the entire book Object.

Figure 10:
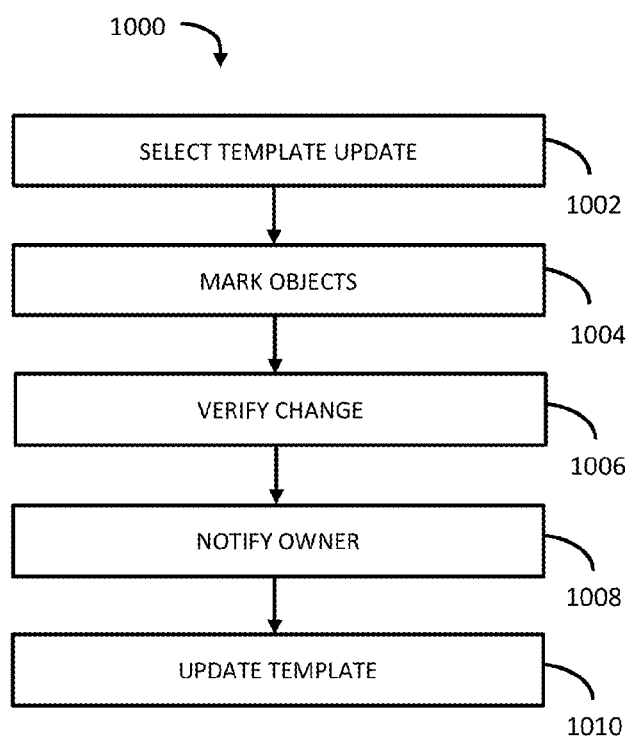
FIG. 10 is a block diagram of an embodiment of a method for updating a Template.

In an embodiment, Templates 222 are also access controlled Objects 702 and this is how EBS 100 controls the form of a Genre 220, for consistency. An exemplary method 1000 for Template editing, shown in FIG. 10, which is similar to the example above, is as follows:

In step 1002, a principal indicates a desire to update a Template 222. In step 1004, specific Objects 702 in the Templates which have been proposed for change are marked, as in a difference list. In step 1006, a Verifier 712 or Delegate 714 as defined in the parent Template is called. If the Verifier fails anywhere, the Template edit fails.

In step 1008, if the Verifier succeeds, a notification is sent to the Template 222 owner. Since the template is an Object 702, it has an owner, such as an author. In step 1010, the Template is updated either as a Template override, or as a new Template that inherits characteristics from the parent. In an embodiment, if the verification in step 1006 was not performed by the Template owner, the Template owner may perform a final verification of the changes before the Template is updated.

An exemplary method for applying a Permission 708 to an Object 702 is as follows:

First, EBS 100 checks to see if the Object 702 has a Permission 708 indicating that it can be edited by the requestor. If the EBS determines that the Object is not editable by the requestor, then access is denied. If the EBS determines that the Object is editable by the requestor, then the EBS may callback the Verifier 712 for an Object update.

A Permission 708 may be refined enough to be specific for a single Object 702. Methods known in the art can be used to provide this access control, including access control lists, capability models or claims-based access controls.

The following tables illustrate examples of how permissions may be applied by EBS 100 in some embodiments.

EXAMPLE 1

Find a social group for a Genre 220 and join it.

| Action | Permissions |
|---|---|
| Search the target platform for the social group, evaluate any membership criteria (can be a validated Claim by the requester) and if satisfied add the caller to the group. Else return the Permission required to join. | Permission on the join operation on the social group. |

EXAMPLE 2

Post a portion of a book 122 on a page in a social group. For example, post book parts, post Scribbles on a book, post a resume as an e-book or application reference on a third party system.

| Action | Permissions |
|---|---|
| Decide if the user has rights on the content for the purpose of posting on the group and then, if allowed, post the content on the group, provided that group post Permissions are also satisfied. | Permission to post to group. Permission on Object that has to be rendered by EBS and posted to the group. |

EXAMPLE 3

Post part of a book on ELANCE with the intent to improve it by adding illustrations that will use EBS to post back—this is a request response flow.

| Action | Permissions |
|---|---|
| Decide if Permission grants user to post the part.<br>Register the editor of the part on EBS through a web service callback to EBS and through Single Sign On (SSO) with the end platform (e.g. FACEBOOK ID).<br>Create a variant of the part that is access controlled to the ID/Claim passed from the third party system ID.<br>Notify content creator(s) that updates are available. A content creator ID/Claim may be a FACEBOOK ID, and so notification goes back to that ID/Claim. | Permission on Object that has to be rendered by EBS and posted to the group.<br>Edit Access Control List (ACL) for revised object to include editor ID and grant write permissions to the part defined by a Focus. |

EXAMPLE 4

For an input or output book part, ensure that an Object 702 being imported undergoes a virus scan and also an editorial review for content by an editor who is skilled in the art of editing for the Genre 220.

| Action | Permissions |
|---|---|
| Before the Object can be imported into the book, it needs to pass through two Verifiers in sequence - a virus scanner and an editor (who is represented as an Object in EBS). | EBS defines the base flow through the Verifiers in the Templates.<br>EBS searches for editors that satisfy the claims required for access and then creates a list of editors.<br>It then asks the third party system to issue security tokens that it can use to verify the claims, which can be produced by the third party system STS.<br>The next step is that of identifying and verifying the credentials of multiple editors who may have to satisfy the requirements of the Claim (namely that they have skill score of 4 points or above). The EBS may break ties by checking against other attributes specified in the Template, such as the fact that a person has to be a children's book editor if the Genre is that of a children's book.<br>Finally, if the Claims are satisfied, then the Object is passed through the pipeline. In case any Claim cannot be satisfied, an error is returned to the author. It is possible to check this at the time that the pipeline itself is defined so that authors can check to see if their proposed pipeline can be satisfied. |
| In a Claims based implementation, the system template states that all imported Objects have to pass through two Verifiers. The first Verifier has to satisfy the following Claims: It is an antivirus scanner as recognized by the EBS? The second Verifier may have to, for example, satisfy the Claim that he is a book editor and that a rating of the editor is 4 stars or above. In this case it is assumed that the EBS has a trust relationship with the third party system and can verify the integrity of tokens issued by third party systems Secure Token Server (STS) that carries Claim tokens. | |

The following elements may be present in a revenue sharing model that is applied to EBS 100. An author may receive a share of revenues from a republished work incorporating content created by a re-author based on either the number of copies sold, or the monetary value of the sales. In an embodiment, copies of the variant book, which includes content added by the re-author, count towards the sales rank of the original author in the same metric fraction that is negotiated for revenue. An original author can negotiate either of the revenue models with re-authors. A benefit of using the number of copies sold as a metric is to normalize across markets with different currencies.

In an embodiment, EBS 100 receives a share of the sales, but is biased towards a derivative works model in the sense that a smaller fraction is taken off the top for CC-BY-SA vs. CC-BY-ND and where the fraction is inversely proportional to the proportion if CC-BY-ND parts relative to CC-BY-SA parts of the book.

An invention according to the above described embodiments may provide one or more of the following attributes. In such a system, an author is afforded a high degree of control over the creation, editing, and publication of an electronic or hard copy book. An author may specify one or more intents with respect to the book, and the system will facilitate those intents before and after a book is published. Re-authoring portions of the book is possible, so that persons other than the author can contribute content to later versions of a book. As a result, a book according to the present invention may be continually updated and republished over time to stay current and otherwise evolve. And integration with third party systems including social networking websites allows an author to access a plurality of marketing channels.

What is claimed is:
1. A computer implemented method for creating an electronic book, the method comprising:
    providing a genre from a plurality of genres on a display device, each genre being associated with at least one template;

providing a template for the genre, the template including an object policy configured to protect portions of the book that are selected by a first user;
providing an intent element which reflects the first user's intent with respect to a first portion of the book;
receiving a genre selection, an intent element selection, and the protected portions selection from the first user;
applying a first permission associated with the intent element to a first portion of the book;
binding a first content to the first portion of the book;
causing the book including the genre and the template to be published; and
providing a second content based on contextual data that is specific to a reader.

2. The method of claim 1, wherein the first portion of the book is a set of objects sharing a common predicate from among a plurality of predicates, and is selected based on the common predicate.

3. The method of claim 2, wherein the common predicate is the intent element.

4. The method of claim 1, wherein the contextual data that is specific to a reader is reader location data.

5. The method of claim 1, further comprising:
applying a second permission to a second portion of the book which is not included in the first portion of the book.

6. The method of claim 1, further comprising:
providing business intelligence including a rating of a second user and sales information for other books in the genre.

7. The method of claim 1, wherein the step of publishing the book includes sending book printing information to a printer to print at least one hard copy of the book.

8. The method of claim 1, wherein the intent element includes a request for a bid to add content to the first portion of the book.

9. The method of claim 1, wherein the first permission is a permission for a second user to contribute content to a portion of the book, the method further including:
applying a second permission to a second portion of the book which is not included in the first portion;
distributing a copy of the book to the second user;
incorporating content created by the second user into the first portion of the book to create a second book; and
publishing the second book.

10. The method of claim 9, wherein the steps of publishing the book and publishing the second book include applying a copyright to the book and the second book.

11. The method of claim 9, wherein the first permission is a permission to add content to the first portion of the book, and the second permission is a restriction that does not permit adding content to the second portion of the book.

12. A non-transitory computer readable medium including a computer executable program thereon, the non-transitory computer readable medium comprising:
code for providing a genre from a plurality of genres on a display device, each genre being associated with at least one template;
code for providing a template for the genre, the template including an object policy configured to protect portions of the book that are determined by a first user;
code for providing an intent element which reflects the first user's intent with respect to a first portion of the book;
code for applying a first permission associated with the intent element to a first portion of the book;
code for receiving a genre selection, an intent element selection, and the protected portions selection from the first user;
code for binding a content to the first portion of the book; and
code for causing the book including the genre and the template to be published.

13. The non-transitory computer readable medium of claim 12, wherein the method performed by the processor further comprises:
applying a second permission to a second portion of the book which is not included in the first portion of the book.

14. The non-transitory computer readable medium of claim 12, wherein the non-transitory computer readable medium further includes code for providing business intelligence including a rating of a second user and sales information for other books in the genre.

15. The non-transitory computer readable medium of claim 12, wherein publishing the book includes sending book printing information to a printer to print at least one hard copy of the book.

16. The non-transitory computer readable medium of claim 12, wherein the intent element includes a request for a bid to add content to the first portion of the book.

17. The non-transitory computer readable medium of claim 12, wherein the first permission is a permission for a second user to contribute content to a portion of the book, and wherein the non-transitory computer readable medium further includes:
code for applying a second permission to a second portion of the book which is not included in the first portion;
code for distributing a copy of the book to the second user;
code for incorporating content created by the second user into the first portion of the book to create a second book; and
code for causing the second book including the content created by the second user to be published.

18. The non-transitory computer readable medium of claim 17, wherein the steps of publishing the book and publishing the second book include applying a copyright to the book and the second book.

19. An electronic book system including:
a processor;
a display device; and
a computer readable medium including a computer executable program thereon, the computer readable medium comprising:
code for providing a genre from a plurality of genres on a display device, each genre being associated with at least one template,
code for providing a template for the genre, the template including an object policy configured to protect portions of the book that are determined by a first user,
code for providing an intent element which reflects the first user's intent with respect to a first portion of the book,
code for applying a first permission associated with the intent element to a first portion of the book,
code for receiving a genre selection, an intent element selection, and the protected portions selection from the first user,
code for binding a content to the first portion of the book, and
code for causing the book including the genre and the template to be published.

20. The electronic book system of claim 19, wherein the intent element includes a request for a bid to add content to the first portion of the book.

21. The electronic book system of claim 19, wherein the computer readable medium further comprises:
    code for providing business intelligence including a rating of a second user and sales information for other books in the genre.

22. The electronic book system of claim 19, wherein the computer readable medium further comprises:
    code for providing a second permission associated with a second portion of the book which is separate from the first portion of the book.

23. The electronic book system of claim 22, wherein the computer readable medium further comprises:
    code for providing a second book including content which has been added by the a second user based on the first permission.

* * * * *